United States Patent
Chai

(10) Patent No.: US 9,511,857 B2
(45) Date of Patent: Dec. 6, 2016

(54) DISC-SHAPED AIRCRAFT WITH DUAL SPINNING DISCS

(71) Applicant: Guijing Chai, Changzhi (CN)

(72) Inventor: Guijing Chai, Changzhi (CN)

( * ) Notice: Subject to any disclaimer, the term of this patent is extended or adjusted under 35 U.S.C. 154(b) by 207 days.

(21) Appl. No.: 14/390,984

(22) PCT Filed: Mar. 7, 2013

(86) PCT No.: PCT/CN2013/072279
§ 371 (c)(1),
(2) Date: Jan. 26, 2015

(87) PCT Pub. No.: WO2013/149534
PCT Pub. Date: Oct. 10, 2013

(65) Prior Publication Data
US 2015/0203199 A1    Jul. 23, 2015

(30) Foreign Application Priority Data

Apr. 6, 2012   (CN) .......................... 2012 1 0099079

(51) Int. Cl.
| | | |
|---|---|---|
| *B64C 39/00* | (2006.01) | |
| *B64C 29/00* | (2006.01) | |
| *B64C 27/605* | (2006.01) | |
| *B64C 27/08* | (2006.01) | |
| *B64C 27/20* | (2006.01) | |

(52) U.S. Cl.
CPC ............. *B64C 39/001* (2013.01); *B64C 27/08* (2013.01); *B64C 27/20* (2013.01); *B64C 27/605* (2013.01); *B64C 29/00* (2013.01); *B64C 39/006* (2013.01)

(58) Field of Classification Search
CPC .......... B64C 39/06; B64C 13/04; B64C 27/20; B64C 29/00; B64C 39/001; B64C 39/003; B64C 39/006; B64C 2201/027; B64C 2201/108; B64C 27/08; Y02T 50/34
See application file for complete search history.

(56) References Cited

U.S. PATENT DOCUMENTS

2005/0067527 A1    3/2005  Petersen

FOREIGN PATENT DOCUMENTS

| CN | 681290 A5 | 2/1993 |
|---|---|---|
| CN | 101525051 A | 9/2009 |
| CN | 101857087 A | 10/2010 |
| CN | 102336271 A | 2/2012 |
| CN | 102602539 A | 7/2012 |
| DE | 10014899 A1 | 9/2001 |

OTHER PUBLICATIONS

International Search Report from International Appln. No. PCT/CN2013/072279 dated May 16, 2013.
Written Opinion from International Appln. No. PCT/CN2013/072279 dated May 3, 2013.

*Primary Examiner* — Timothy D Collins
*Assistant Examiner* — James Atwell
(74) *Attorney, Agent, or Firm* — Greenberg Traurig, LLP

(57) ABSTRACT

Disclosed is a disc-shaped aircraft with dual spinning discs, comprising an engine, an upper fuselage, a lower fuselage, an upper spinning disc and a lower spinning disc. An upper cover is arranged at the bottom of the upper fuselage, and a lower cover is arranged at the top of the lower fuselage. The upper and lower covers are connected as a whole through an axle tube. A central gear is installed on the axle tube. The lower spinning disc is installed on the central gear and the upper spinning disc is located above the lower spinning disc. The engine is fixed on the lower cover and drive the central gear so that the upper and lower spinning discs are driven to rotate. Helical blades of the upper and lower spinning discs are opposite in rotary direction, angle of attack and installation angle, so that the problem of rotary balance of the fuselage is solved. The disc-shaped type aircraft provided by the invention is simple in structure, light in weight and low in cost, and can save much lifting power.

7 Claims, 7 Drawing Sheets

DISC-SHAPED AIRCRAFT WITH DUAL SPINNING DISCS

RELATED APPLICATIONS

This application is a national phase filing under 35 USC 371 of International Application No. PCT/CN2013/072279, filed on Mar. 7, 2013, which claims the benefit of Chinese Provisional Application No. 201210099079.9, filed on Apr. 6, 2012, the entirety of these applications is hereby incorporated herein by reference in their entirety for all purposes.

TECHNICAL FIELD OF THE INVENTION

The present invention relates to an aircraft, and more particularly, to a disc-shaped aircraft.

BACKGROUND

Although there are many types of aircrafts, disc-shaped aircrafts are not common, which are mainly embodied in the appearance of UFOs.

The Chinese patent application No. 201110230142.3 discloses a disc-shaped aircraft comprising an engine, a fuselage and a rotary wing, wherein a rotary wing bracket is arranged at the exterior of the fuselage, fuselage bearings are nested on the fuselage, and helical blades are screwed between the fuselage bearings at the upper or lower portions of the fuselage and free ends of the rotary wing bracket, respectively. During an operation, the helical blades are rotated by the engine, and the helical blades at the upper portion of the fuselage are rotated in a direction opposite to the helical blades at the lower portion of the fuselage. Therefore, the problems involved in fuselage balance and fuselage rotation are solved. However, the structures of such aircrafts are relatively complicated, with relatively higher weights and higher expenditure costs.

SUMMARY

The present invention aims to provide a disc-shaped aircraft with dual spinning discs, which has a simpler structure with lighter weight and lower cost and can operated with less elevating power.

The disc-shaped aircraft with dual spinning discs according to the present invention comprises: an engine, an upper fuselage, a lower fuselage, an upper spinning disc and a lower spinning disc. A glass top cover is disposed upon the upper fuselage. A bottom cover and legs are disposed below the lower fuselage, and a hatch cover is provided on the bottom cover.

An upper cover is disposed at the bottom of the upper fuselage, and a lower cover is disposed at the top of the lower fuselage. The upper and lower covers are connected integrally via an axle tube which passes through the central holes thereof. A central gear is mounted on the axle tube via an axle tube bearing. The engine is fixed upon the lower cover, and an output shaft of the engine is engaged, via a bevel gear, with a driving gear which is engaged with the central gear. A tension ring, the lower portion of which is fixed to the upper cover, is mounted on the exterior of the upper fuselage.

An upper bearing ring is mounted on the upper fuselage, and a lower bearing ring is mounted on the lower fuselage. The upper bearing ring is fixed at the upper portion of the tension ring, and the lower bearing ring is fixed at the lower cover. Bearing races are disposed on the upper surface of the lower bearing ring and the lower surface of the upper bearing ring, respectively.

The lower spinning disc is formed of: a lower spinning disc inner ring connecting plate, a lower spinning disc inner ring fixed on the outer periphery of the lower spinning disc inner ring connecting plate, a lower spinning disc outer ring concentrically disposed with the lower spinning disc inner ring, and helical blades disposed between the lower spinning disc inner ring and the lower spinning disc outer ring. Both the upper and lower surfaces of the lower spinning disc inner ring are provided with bearing races. The lower spinning disc is engaged on the central gear via sprocket holes which are disposed at the center of the lower spinning disc inner ring connecting plate. The bearing races on the lower surface of the lower spinning disc inner ring are operatively cooperated with the bearing races on the upper surface of the lower bearing ring by means of the rotation of rolling balls.

The upper spinning disc, which is located above the lower spinning disc, includes an upper spinning disc inner ring, an upper spinning disc outer ring concentrically disposed with the upper spinning disc inner ring, and helical blades disposed between the upper spinning disc inner ring and the upper spinning disc outer ring. Both the upper and lower surfaces of the upper spinning disc inner ring are provided with bearing races. The bearing races on the upper surface of the upper spinning disc inner ring are cooperated with the bearing races on the lower surface of the upper bearing ring by means of the rotation of rolling balls.

At least three guide wheels are disposed on the tension ring. The guide wheels are placed between the upper spinning disc inner ring and the lower spinning disc inner ring, and are respectively cooperated with the bearing races on the lower surface of the upper spinning disc inner ring and the upper surface of the lower spinning disc inner ring in a rolling manner.

Further, the present invention also arranges toothed tracks at the outer side of the bearing races of the lower surface of the upper screw disc inner ring and the upper surface of the lower screw disc inner ring. The tension ring is provided with at least three guide gears which are placed between the upper screw disc inner ring and the lower screw disc inner ring, and are respectively engaged with the toothed tracks disposed on the lower surface of the upper screw disc inner ring and the upper surface of the lower screw disc inner ring.

Wherein, the guide gears are uniformly arranged among the guide wheels.

In the present invention, the helical blades are radially distributed around the axel tube, and the windward sides of the helical blades are arranged in an elevation angle.

The top side of any one of the helical blades and the bottom side of a helical blade which is adjacent thereto are in the same vertical plane, and all of the helical blades are provided in a horizontal plane without any gaps.

Further, according to the present invention, hatch doors are separately disposed at the corresponding positions of the upper and lower covers and the lower screw disc inner ring connecting plate.

The disc-shaped aircraft with dual spinning discs according to the present invention is provided with parallel flat plate-shaped spinning discs which are mounted in the upper and lower levels in the middle part of the fuselage. The helical blades, each of which is radially distributed around the central axis of the fuselage, are arranged between the spinning disc inner ring and the spinning disc outer ring. When the engine is in operation, it drives the lower spinning disc to rotate, so that the low spinning disc is forced to flutter upward and then abuts against the guide wheels upwardly, which in turn forces the upper spinning disc to rotate inversely. Since the helical blades of the upper and lower spinning discs are rotated in opposite directions, elevation angles and installation angles, the problem of rotary balance of the fuselage is solved. Because the windward sides of the helical blades are arranged in an elevation angle and the top side of one of the helical blades and the bottom side of an adjacent helical blade are arranged in the same vertical plane, all the helical blades entirely cover the space which are occupied by these blades, so that the air in this space can be completely utilized without any leakage, thereby maximizing the elevating power of the aircraft. As compared to a propcopter, the aircraft according to the present invention can be elevated in such a situation that the rotation speed of the spinning disc is several times less than that of the propeller. In other words, a conventional engine is sufficient enough.

Compared with the disc-shaped aircraft described in the background portion, the spinning discs according to the present invention have a structure of flat plate, whereas the spinning discs in the prior art have a trapezoidal structure. The structure of the present invention can maximize the diameter of the spinning disc outer rings in a condition that the lengths of helical blades are equal. The helical blades are evenly set along the spinning disc outer ring so that the tensile strength of the spinning disc outer rings can be developed and utilized to a maximum extent. As long as the tensile strength of the spinning disc outer rings can keep the diameter of the spinning disc outer rings unchanged when the spinning discs are rotated at a high speed, the spinning disc outer rings will not flutter up and down considerably. Accordingly, the present invention eliminates devices such as a locating bearing ring of the rotary wing bracket, etc., thereby providing an aircraft with a simpler and lighter structure.

The Disc-shaped aircraft according to the present invention can implement an elevating function only with one dynamic force. If it is provided with air holes or other steering or balance devices, the disc-shaped aircraft according to the present invention can also carry out various actions such as flying forward, flying backward, flying left, flying right or overall rotation.

Wherein, 1—glass top cover; 2—upper spinning disc; 3—ower spinning disc; 4—legs; 5—upper spinning disc inner ring; 6—upper spinning disc outer ring; 7—lower spinning disc inner ring; 8—lower spinning disc outer ring; 9—lower spinning disc connecting plate; 10—guide gear; 11—guide wheel; 12—axel tube; 13—central gear; 14—driving gear; 15—bevel gear; 16—engine; 17—upper cover; 18—lower cover; 19—tension ring; 20—upper bearing ring; 21—lower bearing ring; 22—axel tube bearing; 23—upper fuselage; 24—lower fuselage; 25—bottom cover; 26—hatch cover; 27—hatch door; 28—helical blades; 29—bearing race; 30—toothed track; 31—rolling balls.

DETAILED DESCRIPTION

Below, the present invention will be further described in details with reference to the accompanying drawings and embodiments. However, it is appreciated that the embodiments are not intended to limit the scope of the present invention.

Figure 1:
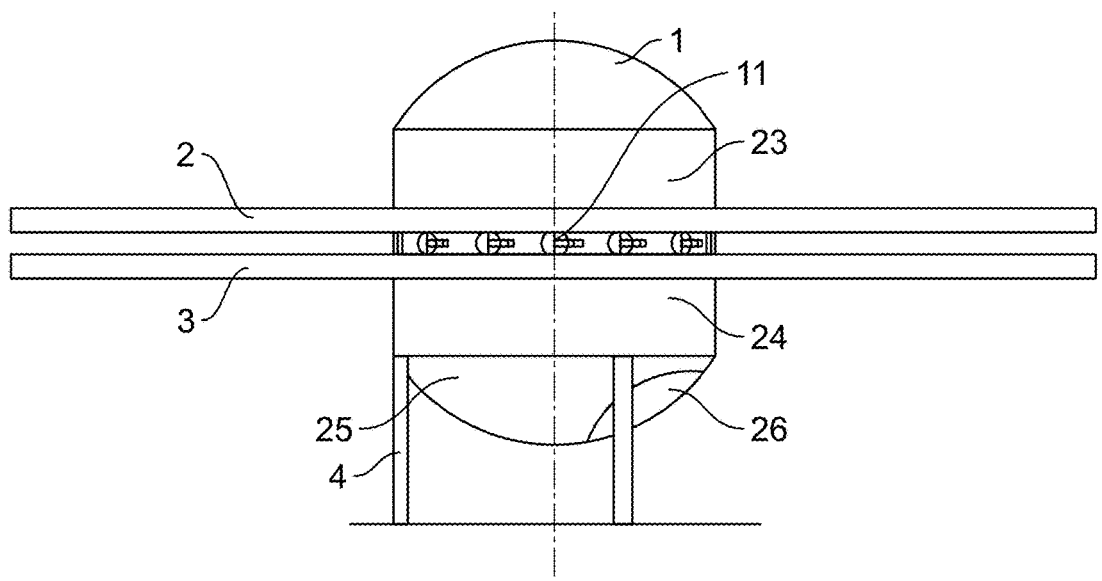
FIG. 1 is a structural schematic view of one embodiment of the present invention.

As illustrated in FIG. 1, the disc-shaped aircraft with dual screw discs includes: an engine 16, an upper fuselage 23, a lower fuselage 24, an upper spinning disc 2 and a lower spinning disc 3. A glass top cover 1 is disposed above the upper fuselage 23. A bottom cover 25 and legs 4 are provided under the lower fuselage 24. Further, a hatch cover 26 is disposed on the bottom cover 25. The upper spinning disc 2 and the lower spinning disc 3 are mounted between the upper fuselage 23 and the lower fuselage 24.

Figure 2:
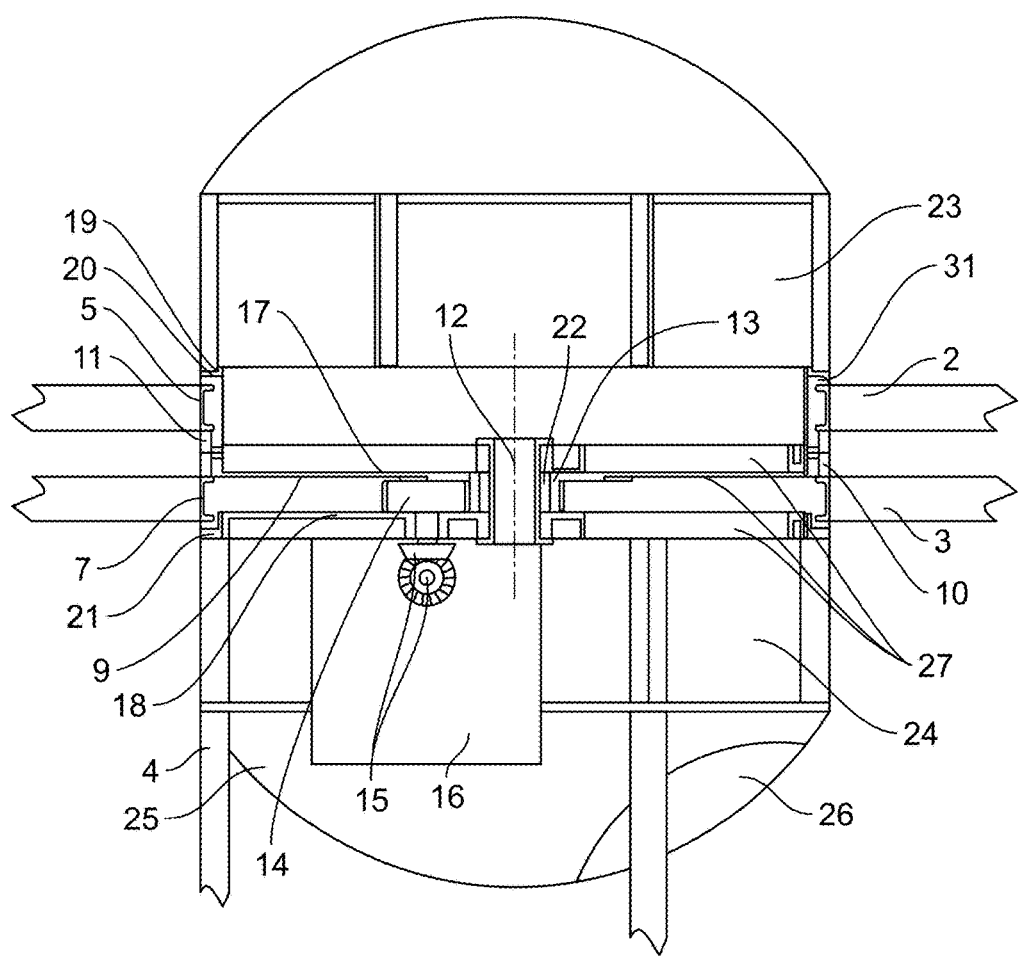
FIG. 2 is a sectional schematic view the structure of the fuselage portion according to one embodiment of the present invention.
Figure 4:
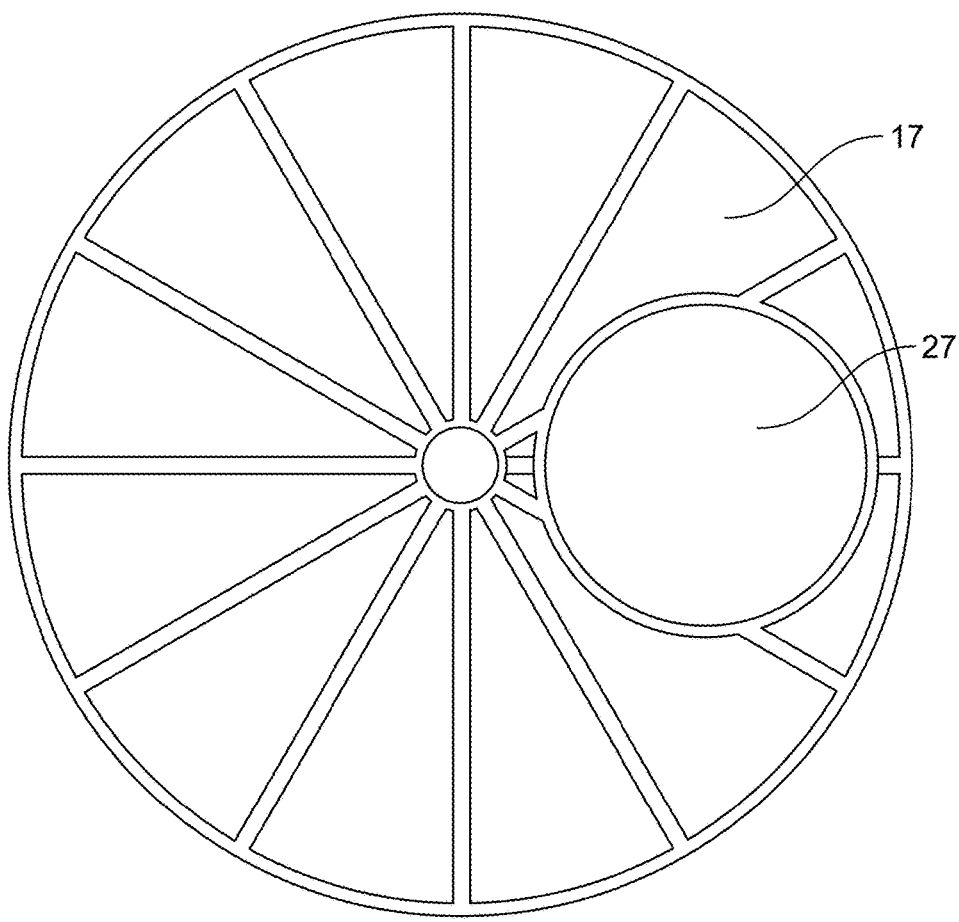
FIG. 4 is a structural schematic view of the upper cover shown FIG. 2.
Figure 5:
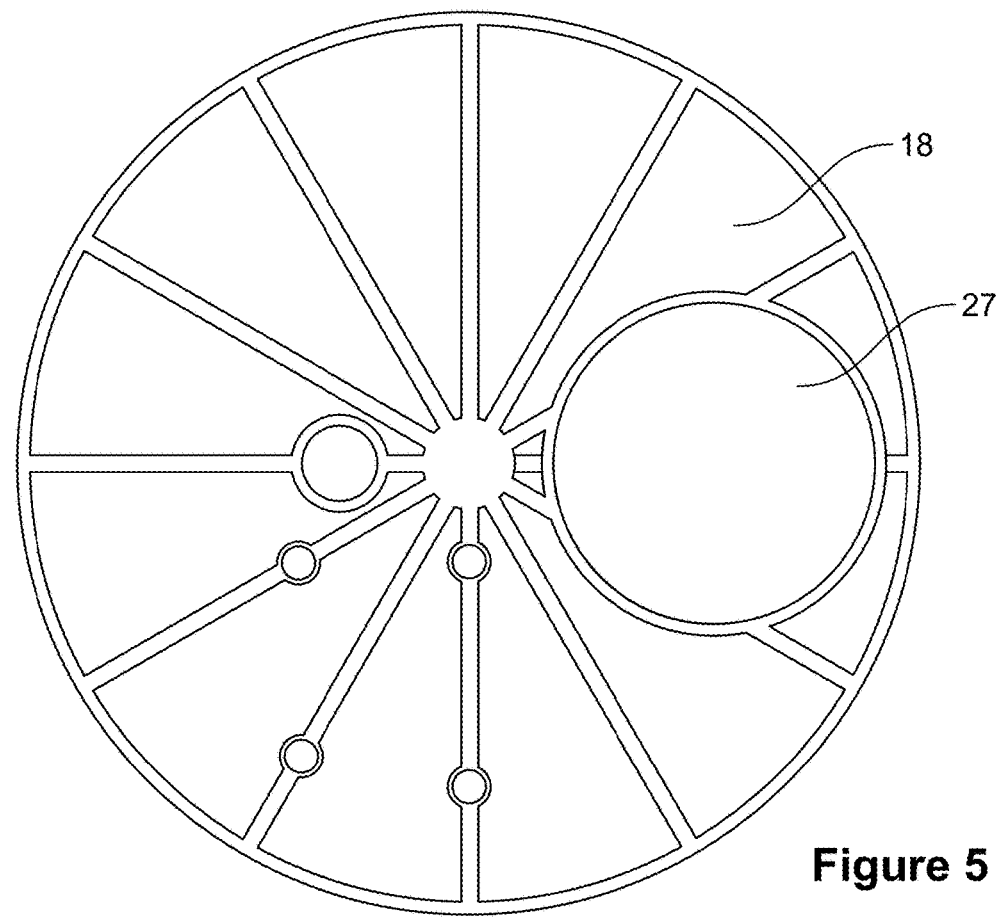
FIG. 5 is a structural schematic view of the owe cover shown in FIG. 2.

As shown in FIG. 2, the structure of the fuselage of the aircraft according to the present invention can be divided into two parts, i.e., an upper part and a lower part. An upper cover 17 as shown in FIG. 4 is arranged at the bottom of the upper fuselage 23, and a lower cover 18 as shown in FIG. 5 is arranged at the top of the lower fuselage 24. The upper cover 17 and the lower cover 18 are connected integrally via an axle tube 12 which passes through the central holes thereof. The exterior of the upper cover 17 is fixed to the lower portion of a tension ring 19. A bearing ring 20 is securely connected to the exterior of the upper portion of the tension ring 19. And, the exterior of the lower cover 18 is securely connected with a lower bearing ring 21. Bearing races 29 are disposed on the lower surface of the upper bearing ring 20 and the upper surface of the lower bearing ring 21, respectively.

The power unit of the disc-shaped aircraft with dual spinning discs is an engine 16 mounted on the lower cover 18. An output shaft of the engine is connected to a gearbox and then is connected with a bevel gear 15 so that the output shaft may transform a horizontal axial rotation into a vertical axial rotation and then transmit the vertical axial rotation to a driving gear 14. The driving gear 14 is engaged with a central gear 13 which is mounted on the axel tube 12 via an axel tube bearing 22, so that the central gear 13 is driven to rotate and thus drives the upper spinning disc 2 and the lower spinning disc 3 to rotate.

Figure 3:
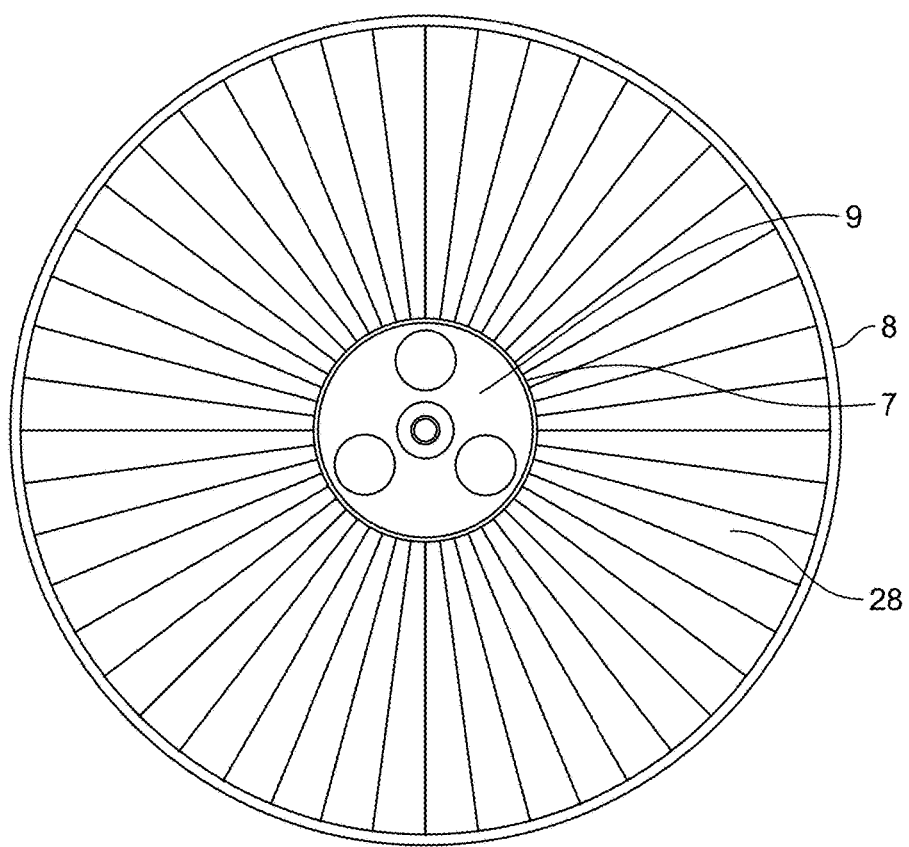
FIG. 3 is a structural schematic view of the lower spinning disc shown in FIG. 2.
Figure 9:
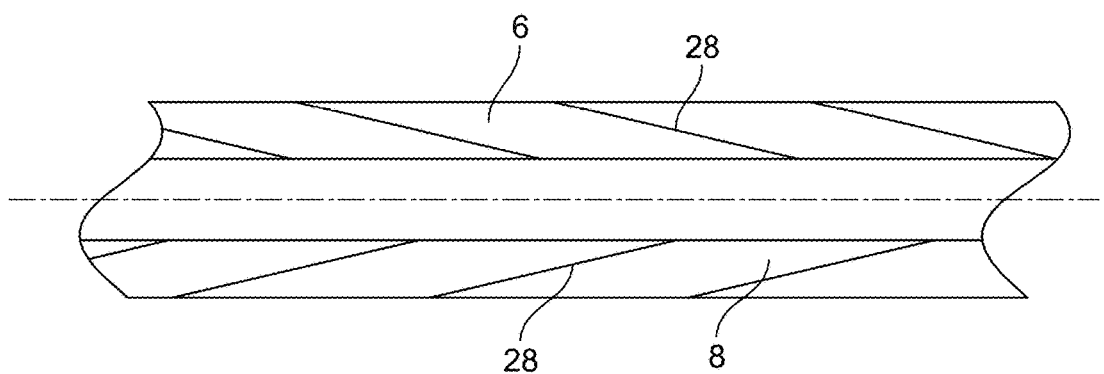
FIG. 9 is a straight-line spread schematic view of the installation positions of the helical blades mounted on the upper and lower spinning discs.

FIG. 3 illustrates the structure of the lower spinning disc 3. The lower spinning disc 3 is formed of: a lower spinning disc inner ring connecting plate 9, a lower spinning disc inner ring 7 secured on the outer periphery of the lower spinning disc inner ring connecting plate 9, a lower spinning disc outer ring 8 concentrically disposed with the lower spinning disc inner ring 7, and helical blades 28 disposed between the lower spinning disc inner ring 7 and the lower spinning disc outer ring 8. The lower spinning disc inner ring connecting plate 9 is provided at its centre with an internal sprocket hole which has the same dimension as the outer tooth of the central gear 13. The lower spinning disc 3 is engaged with the central gear 13 via the internal sprocket hole. Each of the helical blades 28 is radially distributed around the centre of the lower spinning disc 3. Each of the windward side of the helical blades is arranged in an elevation angle, and the top side of any one of the helical blades and the bottom side of an adjacent helical blade are located in the same vertical plane, as illustrated in FIG. 9.

The upper spinning disc 2, which has a similar structure to the lower spinning disc 3, is located above the lower spinning disc 3 and is comprised of an upper spinning disc inner ring 5, an upper spinning disc outer ring 6 concentrically disposed with the upper spinning disc inner ring 5, and helical blades 28 disposed between the upper spinning disc inner ring 5 and the upper spinning disc outer ring 6. The helical blades 28 mounted on the upper spinning disc 2 and the helical blades 28 mounted on the lower spinning disc 3 are opposite in windward side and angle. Therefore, the upper spinning disc 2 is rotated in a direction opposite to the lower spinning disc 3.

Figure 6:
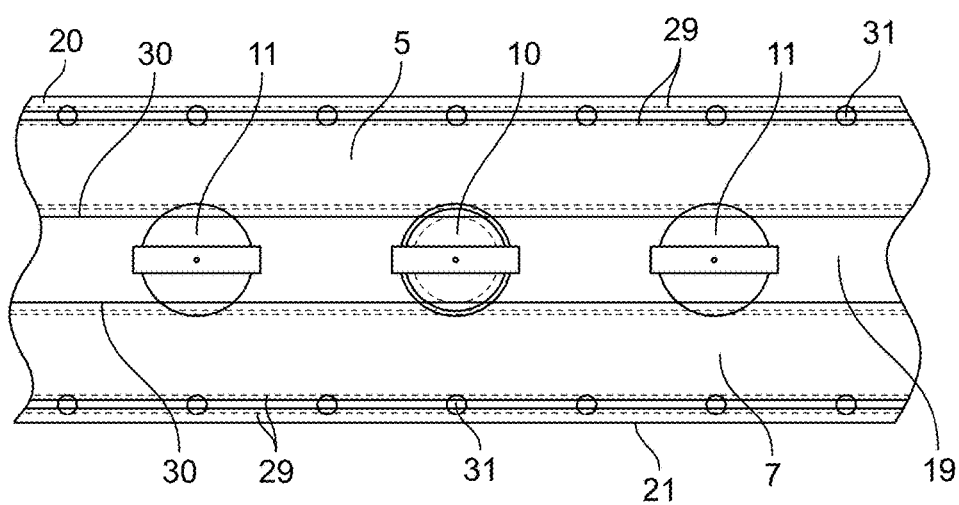
FIG. 6 is a straight-line spread schematic view of the installation structure of the upper and lower spinning disc inner rings and the upper and lower bearing rings shown in FIG. 2.

As shown in FIG. 6, the upper and lower surfaces of the upper spinning disc inner ring 5 and the upper and lower surfaces of the lower spinning disc inner ring 7 are all provided with bearing races 29, the centre of which is consistent with the centre of the bearing races 29 arranged on the lower surface of the upper bearing ring 20 and the upper surface of the lower bearing ring 21, and the diameter of which is equal to the diameter of the bearing races on the lower surface of the upper bearing ring 20 and the upper surface of the lower bearing ring 21. The bearing race 29 of the lower surface of the lower spinning disc inner ring 7 is operatively cooperated with the bearing race 29 of the upper surface of the lower bearing ring 21 by means of rotation of rolling bails 31, and the bearing race 29 of the upper surface of the upper spinning disc inner ring 5 is operatively cooperated with the bearing race 29 of the lower surface of the upper bearing ring 20 by means of the rotation of rolling balls 31.

Figure 7:
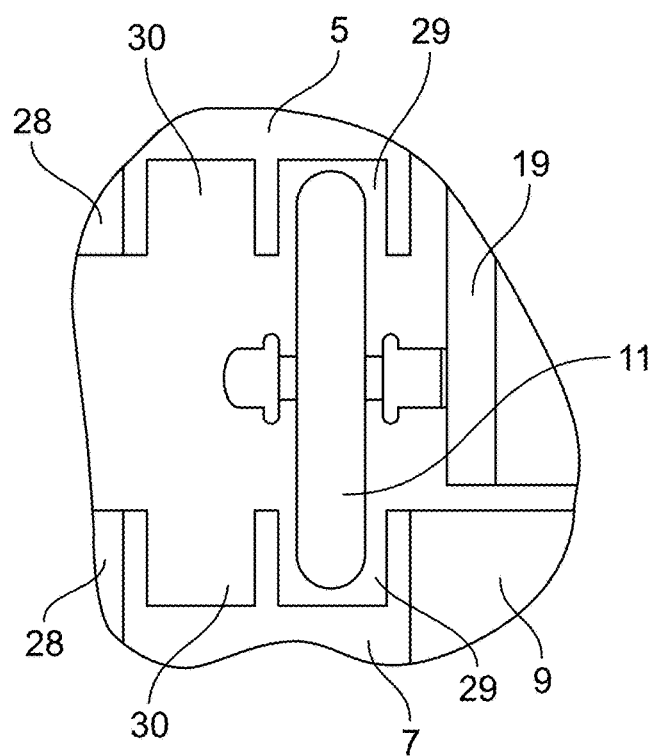
FIG. 7 is a schematic view showing the installation structure of the guide wheels shown in FIG. 2.

Meanwhile, the bearing race 29 of the lower surface of the upper spinning disc inner ring 5 is also cooperated with the bearing race 29 of the upper surface of the lower spinning disc inner ring 7 by means of the rotation of dozens of guide wheels 11 mounted on the tension ring 19, as illustrated in FIG. 7.

When the lower spinning disc 3 is rotated at a low speed, the upper spinning disc 2 forces the guide wheels 11 disposed between the upper and lower spinning disc inner rings to rotate by its own weight, and then rotates inversely. As the rotation speed of the lower spinning disc 3 reaches a certain amount, the elevating power produced by the lower spinning disc 3 will force the guide wheels 11 disposed between the upper and lower spinning disc inner rings to rotate therewith, and thus force the upper spinning disc 2 to rotate inversely.

Figure 8:
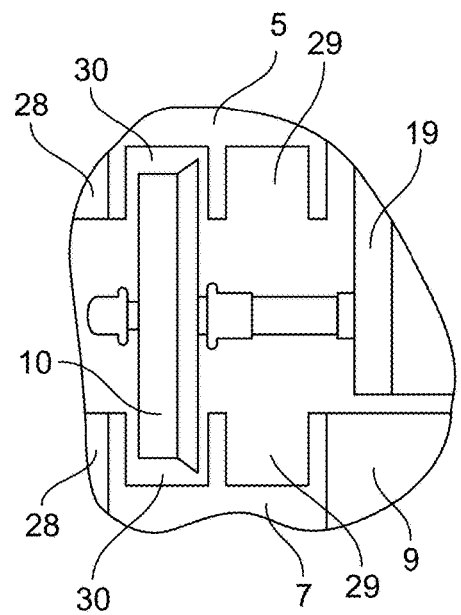
FIG. 8 is a schematic view show the installation structure of the guide gear shown in FIG. 2.

To avoid of the sliding of the guide wheels 11, at least three guide gears 10, which are engaged with the toothed tracks 30 of the upper and lower spinning disc inner rings, are uniformly arranged between the guide wheels 11 so as to ensure that the speeds of the upper and lower spinning disc inner rings are kept consistent. As shown in FIG. 8, the toothed tracks 30 are respectively disposed at the outer side of the bearing races 29 that are arranged on the lower surface of the upper spinning disc inner ring 5 and the upper surface of the lower spinning disc inner ring 7. The guide gears 10 disposed on the tension ring 19 are separately engaged with the toothed tracks 30 disposed on the lower surface of the upper spinning disc inner ring 5 and the upper surface of the lower spinning disc inner ring 7.

The upper and lower spinning discs as a whole will slightly flutter up and down during an operation. Therefore, the guide wheels 11 and the guide gears 10 also can he designed to be movable up and down therewith. The internal sprocket holes in the centre of the lower spinning disc inner ring connecting plate 9, which are nested on the central gear 13, can also be moved up and down on the central gear 13.

In addition, hatch doors 27 are separately disposed at corresponding positions of the upper cover 17, the lower cover 18 and the lower spinning disc inner ring connecting plate 9.

During the operation, the engine 16 is actuated, and its output shaft is caused to be subject to speed changes so as to transform a horizontal axial rotation into a vertical axial rotation via a bevel gear 15 and deliver the vertical axial rotation to a driving gear 14. The driving gear 14 is meshed with the central gear 13 so that the lower spinning disc 3 is driven to rotate. The lower spinning disc inner ring 7 drives the upper spinning disc inner ring 5 to rotate inversely with the aid of the rotation of the guide wheels 11 and the guide gears 10, so that the upper spinning disc 2 is rotated inversely accordingly. Since the windward sides of the helical blades 28 are arranged in an elevation angle and the rotation directions of the upper and lower spinning discs are opposite to each other, the angles of the helical blades 28 of the upper and lower spinning discs are opposite, but the speeds of the helical blades 28 of the upper and lower spinning discs are identical. Therefore, it produces a balance effect on the fuselage's rotation, which will make the fuselage not to be rotated.

If it is provided with air holes or other steering and/or balance systems, the disc-shaped aircraft with dual screw discs according to the present invention can also control the flight in a forward, backward, left or right direction or the rotary flight.

What is claimed is:

1. A disc-shaped aircraft with dual discs configured to spin, comprising: an engine, an upper fuselage, a lower fuselage, an upper disc configured to spin and a lower disc configured to spin, wherein a glass top cover is disposed above the upper fuselage, a bottom cover and legs are disposed under the lower fuselage, and a hatch cover is provided on the bottom cover, wherein:

an upper cover is disposed at a bottom of the upper fuselage, and a lower cover is disposed at a top of the lower fuselage; the upper and lower covers are connected integrally via an axle tube which passes through central holes thereof; a central gear is mounted on the axle tube via an axle tube bearing; the engine is fixed on the lower cover, and an output shaft of the engine is engaged with a driving gear by means of a bevel gear; the driving gear is engaged with the central gear; a tension ring, a lower portion of which is fixed to the upper cover, is mounted on an exterior of the upper fuselage;

an upper bearing ring is mounted on the upper fuselage, and a lower bearing ring is mounted on the lower fuselage wherein the upper bearing ring is fixed on an upper portion of the tension ring; the lower bearing ring is fixed on the lower cover; and bearing races are respectively arranged on a lower surface of the upper bearing ring and an upper surface of the lower bearing ring;

the lower disc comprises: a lower disc inner ring connecting plate, a lower disc inner ring fixed on the outer periphery of the lower disc inner ring connecting plate, a lower disc outer ring concentrically disposed with the lower disc inner ring, and helical blades disposed between the lower disc inner ring and the lower disc outer ring, wherein both upper and lower surfaces of the lower disc inner ring are provided with bearing races; the lower disc is engaged on the central gear by a sprocket hole which is disposed at a center of the lower disc inner ring connecting plate; and the bearing races on the lower surface of the lower disc inner ring are operatively cooperated with the bearing races on the upper surface of the lower bearing ring by means of rotation of rolling balls;

the upper disc, which is located above the lower disc, comprises: an upper spinning disc inner ring, an upper spinning disc outer ring concentrically disposed with the upper disc inner ring, and helical blades disposed between the upper disc inner ring and the upper disc outer ring, wherein both upper and lower surfaces of the upper disc inner ring are provided with bearing races; the bearing races on the upper surface of the upper disc inner ring are operatively cooperated with the bearing races on the lower surface of the upper bearing ring by means of the rotation of balls configured to roll; and at least three guide wheels are disposed on the tension ring, wherein the guide wheels are placed between the upper disc inner ring and the lower disc inner ring, and are respectively cooperated with the bearing races on the lower surface of the upper disc inner ring and the bearing races on the upper surface of the lower disc inner ring by means of rolling.

2. The disc-shaped aircraft with dual discs as claimed in claim 1, wherein toothed tracks are disposed at outer sides of the bearing races which are arranged on the lower surface of the upper disc inner ring and the upper surface of the lower disc inner ring; and the tension ring is provided with at least three guide gears, which are placed between the upper disc inner ring and the lower disc inner ring, and respectively engaged with the toothed tracks on the lower surface of the upper disc inner ring and on the upper surface of the lower disc inner ring.

3. The disc-shaped aircraft with dual discs as claimed in claim 2, wherein the guide gears are uniformly arranged among the guide wheels.

4. The disc-shaped aircraft with dual discs as claimed in claim 1, wherein the helical blades are radially distributed around the axel tube.

5. The disc-shaped aircraft with dual discs as claimed in claim 1, wherein windward sides of the helical blades are arranged in an elevation angle.

6. The disc-shaped aircraft with dual discs as claimed in claim 1, wherein a top side of any one of the helical blades and a bottom side of the helical blade which is adjacent to the aforesaid one are located in a same vertical plane.

7. The disc-shaped aircraft with dual discs as claimed in claim 1, wherein hatch doors are separately disposed at corresponding positions of the upper and lower covers and the lower disc inner ring connecting plate.

* * * * *